United States Patent
Krallman et al.

(10) Patent No.: US 9,152,624 B1
(45) Date of Patent: Oct. 6, 2015

(54) SYSTEMS AND METHODS FOR VISUAL PRESENTATION AND NAVIGATION OF CONTENT USING DATA-BASED IMAGE ANALYSIS

(75) Inventors: Charles William Krallman, Beef Island (VG); Kenneth Eugene Shaw, Port St. Lucie, FL (US)

(73) Assignee: Retail Optimization International, Inc., Miami Beach, FL (US)

( * ) Notice: Subject to any disclaimer, the term of this patent is extended or adjusted under 35 U.S.C. 154(b) by 57 days.

(21) Appl. No.: 12/953,184

(22) Filed: Nov. 23, 2010

Related U.S. Application Data

(63) Continuation of application No. 10/728,571, filed on Dec. 4, 2003, now abandoned.

(51) Int. Cl.
*G06F 17/30* (2006.01)

(52) U.S. Cl.
CPC .......... *G06F 17/30* (2013.01); *G06F 17/30973* (2013.01)

(58) Field of Classification Search
None
See application file for complete search history.

(56) References Cited

U.S. PATENT DOCUMENTS

| | | |
|---|---|---|
| 3,331,803 A | 7/1967 | Blaschke |
| 4,620,337 A | 11/1986 | Williams et al. |
| 4,673,452 A | 6/1987 | Awdhan |
| 4,686,724 A | 8/1987 | Bedford |
| 5,178,811 A | 1/1993 | Farley |
| 5,572,421 A | 11/1996 | Altman et al. |
| 6,108,665 A | 8/2000 | Bair et al. |
| 6,310,627 B1 | 10/2001 | Sakaguchi |
| 6,381,744 B2 | 4/2002 | Nanos et al. |
| 6,513,071 B2 | 1/2003 | Madl et al. |
| 6,616,458 B1 | 9/2003 | Walker et al. |
| 6,618,746 B2 | 9/2003 | Desai et al. |
| 6,665,577 B2 | 12/2003 | Onyshkevych et al. |
| 6,728,755 B1 | 4/2004 | de Ment |
| 6,865,578 B2 | 3/2005 | Hays |
| 6,877,034 B1 | 4/2005 | Machin et al. |
| 6,895,405 B1 | 5/2005 | Choi et al. |
| 6,912,521 B2 | 6/2005 | Kraft et al. |
| 6,965,912 B2 | 11/2005 | Friedman et al. |
| 6,993,495 B2 | 1/2006 | Smith, Jr. et al. |
| 6,999,987 B1 | 2/2006 | Billingsley et al. |
| 7,013,285 B1 | 3/2006 | Rebane |
| 7,158,988 B1 | 1/2007 | Kirkpatrick et al. |
| 7,216,092 B1 * | 5/2007 | Weber et al. .................. 705/26.5 |
| 7,284,037 B2 | 10/2007 | Kamiya et al. |
| 7,287,003 B2 | 10/2007 | Hodson et al. |
| 7,295,995 B1 * | 11/2007 | York et al. .................... 705/26.8 |

(Continued)

OTHER PUBLICATIONS

Cardani, Darrin, "Creating and Using Mattes for Video Composing," (Apr. 2001).

(Continued)

*Primary Examiner* — Wilson Lee
(74) *Attorney, Agent, or Firm* — Ropes & Gray LLP

(57) ABSTRACT

Systems and methods are provided for implementing a browsing application that allows users to navigate image-based content. Images and associated descriptive attributes describing the images are stored in a database. The user may select an item of interest and an example-based proximity search function may be executed to search for similar images. Images having common descriptive attributes may be grouped together and displayed. A web browser may be implemented and users may select reduced-size images of previously viewed web pages in order to access the web page.

44 Claims, 12 Drawing Sheets

(56) References Cited

U.S. PATENT DOCUMENTS

| | | | |
|---|---|---|---|
| 7,310,350 | B1 | 12/2007 | Shao et al. |
| 7,339,598 | B2 | 3/2008 | Schowtka et al. |
| 7,343,320 | B1 | 3/2008 | Treyz et al. |
| 7,398,223 | B2 | 7/2008 | Kahlert et al. |
| 7,415,663 | B1 | 8/2008 | Kraus |
| 7,475,339 | B2 | 1/2009 | Holloway et al. |
| 7,571,110 | B2 | 8/2009 | Tarr et al. |
| 2002/0002502 | A1 | 1/2002 | Maes et al. |
| 2002/0065705 | A1 | 5/2002 | Wang et al. |
| 2002/0120491 | A1 | 8/2002 | Nelson |
| 2003/0088452 | A1 | 5/2003 | Kelly |
| 2003/0195793 | A1 | 10/2003 | Jain et al. |
| 2004/0015386 | A1 | 1/2004 | Abe et al. |
| 2004/0093296 | A1 | 5/2004 | Phelan et al. |
| 2004/0098315 | A1 | 5/2004 | Haynes et al. |
| 2004/0193477 | A1 | 9/2004 | Barzuza |
| 2005/0055275 | A1 | 3/2005 | Newman et al. |
| 2005/0076012 | A1 | 4/2005 | Manber et al. |
| 2005/0091156 | A1 | 4/2005 | Hailwood et al. |
| 2006/0112092 | A1 | 5/2006 | Ziou et al. |
| 2008/0059279 | A1 | 3/2008 | Goldschneider et al. |

OTHER PUBLICATIONS

Kahveci, Tamer et al., "An Efficient Index Structure for String Databases," 27th VLDB Conference, Rome, Italy, Sep. 2001.

Kiran, G. Naga, "Content Based Image Indexing," Department of Computer Science and Engineering, Indian Institute of Technology, Mumbai (Apr. 20, 2001).

*NetVisualize Favorites Organizer*, http://netvisual.com/index.html, available through Internet Archive Wayback Machine at, http://web.archive.org/web/20030628102315/http://netvisualize.com/index.html, as archived on Jun. 28, 2003.

Tuncel, Ertem et al., "VQ-Index: An Index Structure for Similarity Searching in Multimedia Databases," ACM Multimedia '02, pp. 543-552, Juan Les Pins, France, Dec. 2002.

P. Wu et al., "An Adaptive Index Structure for High-Dimensional Similarity Search," Proc. IEEE Pacific-Rim Conference on Multimedia, Advances in Multimedia Information (PCM '01), Beijing, China, pp. 71-77, Oct. 2001.

Yihong Gong et al., "Image Indexing and Retrieval Based on Human Perceptual Color Clustering," International Conference on Computer Vision and Pattern Recognition, Jun. 1998.

Zakrzewicz, Maciej, "Sequential Index Structure for Content-Based Retrieval," in 'Knowledge Discovery and Data Mining—PAKDD 2001' (eds. David Wai-Lok Cheung, Graham J. Williams, Qing Li), 5th Pacific-Asia Conference, Hong Kong, China, Apr. 16-18, 2001, Proceedings. Lecture Notes in Artificial Intelligence 2035, Springer Vertag. 2001, ISBN 3-540-41910-1, pp. 306-311.

Couper "Web surveys: A review of issues and approaches," The Public Opinion Quarterly, 64:464-494 (2001b).

Crawford "Evaluation of Web survey data collection systems," Field Methods, 14:307-321 (2002).

Kitchenham, B. and Pfleeger, S. L. 2002. Principles of survey research part 4: questionnaire evaluation. SIGSOFT Softw. Eng. Notes 27, 3 (May 2002), 20-23.

* cited by examiner

| ITEM ID | DESCRIPTION | COLOR | MATERIAL | PRICE | PATTERN | STYLE | IMAGE |
|---|---|---|---|---|---|---|---|
| 1 | MEN'S SWEATER | BLUE & GREEN | COTTON | $49.95 | STRIPED | CASUAL | 1.GIF |
| 2 | MEN'S COAT | BROWN | COTTON | $99.95 | SOLID | CASUAL | 2.GIF |
| 3 | MEN'S SHIRT | RED | WOOL | $48.50 | SOLID | CASUAL | 3.GIF |
| 4 | MEN'S SWEATER | GRAY BLUE | COTTON | $49.95 | STRIPED | CASUAL | 4.GIF |
| 5 | MEN'S SWEATER | BLACK TAN | COTTON | $55.50 | STRIPED | CASUAL | 5.GIF |
| 6 | MEN'S TIE | BLUE GRAY | SILK | $25.00 | STRIPED | DRESS | 6.GIF |

FIG. 2

SYSTEMS AND METHODS FOR VISUAL PRESENTATION AND NAVIGATION OF CONTENT USING DATA-BASED IMAGE ANALYSIS

CROSS REFERENCE TO RELATED APPLICATIONS

This application is a continuation of U.S. patent application Ser. No. 10/728,571, filed Dec. 4, 2003, the entire contents of which is incorporated herein by reference.

BACKGROUND OF THE INVENTION

The present invention relates to systems and methods for providing visual presentation and navigation of content using data-based image analysis. More particularly, the present invention relates to systems and methods for allowing users of a browsing software application to search, browse, and navigate collections of data or other content of interest using data-based image analysis.

Systems and methods are known that allow users to visually browse through a virtual space on a computer screen. Web browsers and other database-driven software applications have been developed that provide user-interfaces for allowing users to browse, search for, and otherwise interact with content stored in a database. The content stored in the database may be stored with various relational attributes and may be dynamically presented, sorted, ranked, selected, or viewed in greater detail. This organization of content allows for easy navigation of content and integration with other sources of content.

However, known content browsing software applications typically rely on text and text-based commands for navigation of, and interaction with, database content. For example, information may be stored and presented using the browsing application, and a user of the browsing application may select text-based options or enter text-based criteria for executing a command to search for, filter, enter, update, and sort content, or to perform other data-based operations. A programming language, such as Structured Query Language, typically allows users to execute commands and perform data-based operations. Even when images or other visual objects are used for navigational purposes, they are typically implemented merely as placeholders in the page layout, replacing their text counterparts, but adding little to the interface through their actual content.

It is desirable, however, for database-driven software browsing applications to display as little text as possible to facilitate a user's navigation of stored content.

Publicly known software browsing applications, such as web browsers (e.g., Microsoft's Internet Explorer, Netscape Navigator, etc.), have been developed to facilitate the navigation of vast amounts of content using a combination of selectable text and images. For example, in an online retail environment using a web-based browsing application, a web browser interface may be used to allow a user to select images of retail items in order to find more content related to the selected item. However, the selection of item images typically leads to additional text-based content, and although users may ultimately be presented with an image of an item once the item is located, much of the searching and navigation in an online retail environment involves entering text-based criteria or selecting text-based options. Moreover, images used in a web browsing application typically function only as placeholder display objects having pre-defined data links, while the content of the image is entirely ignored by the web browsing application. The images could effectively be replaced with textual or button objects in the page layout with little or no change in functionality.

It is therefore desirable to provide a graphical user-interface in a virtual retail environment that presents vast amounts of content (e.g., items, item categories, etc.) to users in an image-based, rather than textual, manner.

It is also desirable to provide a graphical user-interface that allows for dynamic user interactions with content (e.g., searching, browsing, navigation, etc.) to be performed in an image-based, rather than textual, manner and, more particularly, for the user interactions to be based on analysis of the actual visual contents of the images such that the application is capable of deducing user intent by evaluating and comparing selected images.

In addition to web-based browsing applications that present selectable images of retail items, and that allow users to access textual database content related to a selected image, systems and methods are known for storing and indexing image-based content in a database. For example various index structures, such as B-Trees, Sequential Indices, Cube Indices, etc. are known and commonly used to store, index, and retrieve image-based content in multimedia databases. Technologies and techniques are also known for automatically detecting and analyzing image data from an external source and for automatically synthesizing, generating, compressing, editing and enhancing stored image data. These techniques would be especially useful for the purpose of storing and navigating content in virtual retail environments having vast amounts of image-based content and would allow users to quickly and easily navigate content in a virtual environment.

It is therefore desirable to provide a graphical user-interface that allows users to navigate a virtual retail space using indexed images of retail items stored in an item database.

It is also desirable to provide a graphical user-interface that groups retail items having common descriptive or visual attributes, thereby allowing users to more easily search for products of interest without requiring traditional text-based operations and commands, and, more particularly, without requiring the user to explicitly define the desired goal of his searching but rather allowing the user to simply provide examples of desired items for the application to analyze and use as a basis for further data retrieval.

It is also desirable to provide systems and methods for implementing a browsing application that is capable of navigating a database system solely on the basis of visual examples of desired items supplied by the user.

It is also desirable to provide a graphical user-interface that allows users to quickly and easily navigate through displays having vast amounts of content, and, more particularly, to allow users to search for content using example-based proximity search techniques.

It is also desirable to provide a graphical user-interface that allows users to navigate a virtual retail environment freely and in a rapid manner.

SUMMARY OF THE INVENTION

It is therefore an object of the present invention to provide systems and methods for database-driven software applications that have as little text as possible to facilitate a user's navigation of stored content.

It is also an object of the present invention to provide a graphical user-interface in a virtual retail environment that presents vast amounts of content (e.g., items, item categories, etc.) to users in an image-based, rather than textual, manner.

It is also an object of the present invention to provide systems and methods for implementing a browsing application with a graphical user-interface that allows for dynamic user interactions with content (e.g., searching, browsing, navigation, etc.) to be performed in an image-based, rather than textual, manner and, more particularly, for the user interactions to be based on analysis of the actual visual contents of the images such that the application is capable of deducing user intent by evaluating and comparing selected images.

It is also an object of the present invention to provide systems and methods for implementing a browsing application with a graphical user-interface that allows users to navigate a virtual retail space using indexed images of retail items stored in an item database.

It is also an object of the present invention to provide systems and methods for implementing a browsing application with a graphical user-interface that groups retail items having common descriptive or visual attributes and allows users to more easily search for products of interest without requiring traditional text-based operations and commands and, more particularly, without requiring the user to explicitly define the desired goal of his searching but rather allowing the user to simply provide examples of desired items for the application to analyze and use as a basis for further data retrieval.

It is also an object of the present invention to provide systems and methods for implementing a browsing application that is capable of navigating a database system solely on the basis of visual examples of desired items supplied by the user.

It is also an object of the present invention to provide systems and methods for implementing a browsing application with a graphical user-interface that allows users to quickly and easily navigate through displays having vast amounts of content, and, more particularly to allow users to search for content using example-based proximity search techniques.

It is also an object of the present invention to provide systems and methods for implementing a browsing application with a graphical user-interface that allows users to navigate a virtual retail environment freely and in a rapid manner.

These and other objects of the present invention are accomplished in accordance with the principles of the present invention by providing systems and methods for implementing a content browsing software application having a graphical user-interface that allows users to navigate image-based content. Retail item information may be stored in a database and may be associated with a particular retail item (e.g., as a record of information for each stored item). One or more images of the item may be stored in the database and associated with the item's database record. The database may also include various descriptive terms associated with the item or image of the item, for example color, pattern, material, size, price, manufacturer or brand, weight, any other suitable descriptive characteristic or a combination thereof. Automatically computed metrics which quantify image content, or externally derived data such as historical sales data, profitability and/or cost data, competitive information, comments about the item, or any other suitable information may also be stored in the database and associated with the item. The images of the items stored in the database, and the associated attribute information, may be indexed using any known structure (e.g., B-Trees, Sequential Indices, Cube Indices, or any other suitable indexing technique or combination of techniques).

A browsing software application having a graphical user-interface may be implemented on a computing device having a display device and used to present the images of items to a user. Users may navigate the item database by selecting images of items and may search for other items having similar descriptive or visual characteristics (e.g., an example-based, "find more like this" proximity search), where the items retrieved from the search will be similar, but not identical, to the selected item. The software browsing application may calculate some measure of distinction between items in terms of descriptive or visual item characteristics (e.g., color, pattern, material, size, price, manufacturer or brand, etc.). This measure of distinction may be used to locate similar items. In this manner, the user of the browsing application may specify search parameters using an example-driven interface, and the user is able to locate items of interest using complex combinations of desired item attributes.

The images of items may be overlaid onto other images. For example, an image of an item may be overlaid on another image of another item to allow the user to better determine how well the items compliment each other. Images of items may also be overlaid on images of a retail space, so that the virtual retail space appears similar to a physical retail space (e.g., a sales floor). In some cases, the software browsing application may present images of several items or item categories in the same display and the user may select an item or item category of interest. The user may then find a particular item of interest by selecting images of items having increasingly similar attributes to the item of interest.

The software browsing application and graphical user-interface may be implemented on any computing device that has a display device, for example a personal computing device, a wireless computing device, a kiosk at a retail location, or any other suitable device or combination of devices. The visual activity of images presented to users, and rate at which each item or item category is selected by users, may be tracked and stored as survey data input. This database organization provides for easy virtual navigation and allows for integration of other data (e.g., transactional data, survey data, etc.).

In one arrangement, the browsing application may be a web-based browsing application and image-based content may be navigated in an online retail environment. The browsing application may also be used in navigational environments other than retail environments. For example, the systems and method for image-based indexing and navigation may be applied to a web browser and used to search, navigate, and browse content accessed via the World Wide Web or other Internet-based resource. The systems and method for image-based indexing and navigation described herein may also be used, for example, to search for and/or navigate images of people (e.g., where images of people stored in a database are associated with attributes describing each person's character or and/or appearance), art (e.g., where images of works of art stored in a database are associated with attributes describing the artwork's appearance or history), or may be used for any other suitable purpose.

BRIEF DESCRIPTION OF THE DRAWINGS

The above and other objects and advantages of the invention will be more apparent upon consideration of the following detailed description, taken in conjunction with the accompanying drawings, in which like reference numerals refer to like parts throughout, and in which:

FIG. 2 shows an illustrative arrangement for storing item information and images in an item database in accordance with the present invention;

DETAILED DESCRIPTION

The present invention is now described in more detail in conjunction with FIGS. 1-13.

Figure 1:
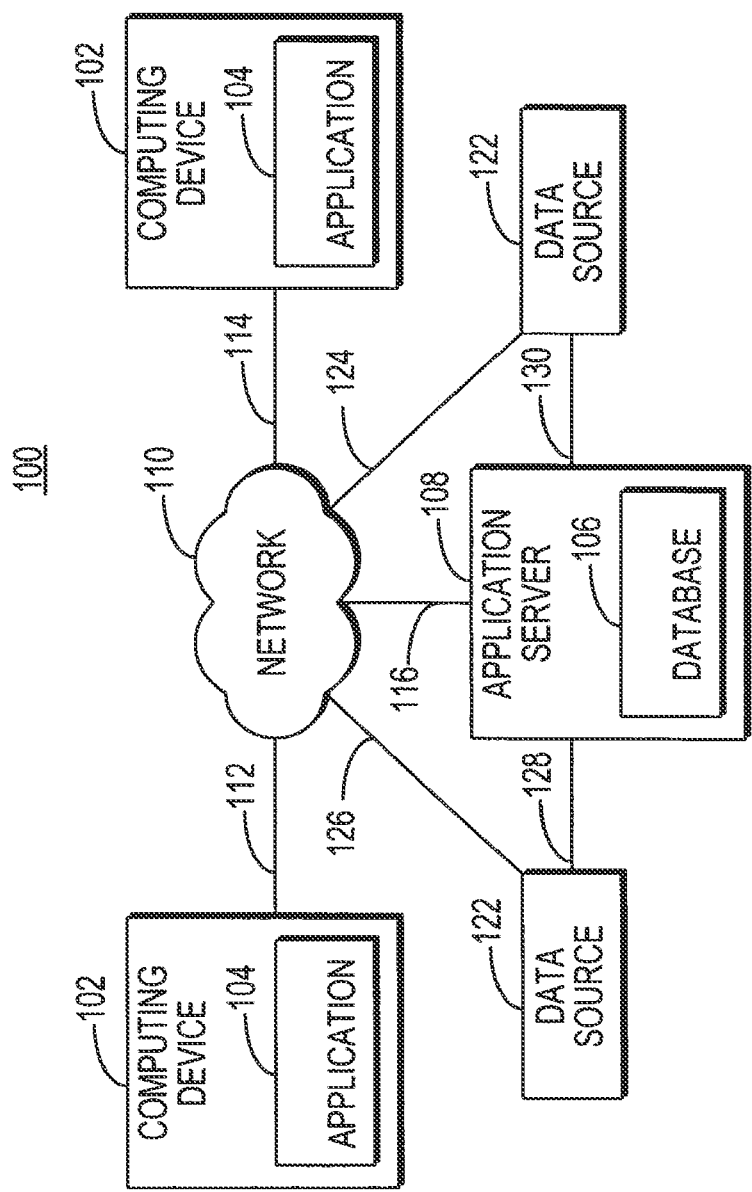
FIG. 1 is a diagram of illustrative software and hardware used in accordance with the present invention.

FIG. 1 is a schematic diagram of illustrative software and hardware 100 that may be used to implement the systems and methods of the present invention. In FIG. 1, a user may operate computing device 102. Computing device 102 may be, for example, a personal computing device (e.g., an IBM-compatible personal computer, an Apple computer, etc.), a handheld computing device (e.g., a personal digital assistant), a wireless computing device, a web-enabled telephone, a point-of-sale terminal, an exit kiosk, or any other suitable electronic or computing device.

Computing device 102 may be located in a retail location (e.g., a department store), or any other suitable location (e.g., a retailer's back office, an end-users home, etc.). There may be many instances of computing device 102 at one or more geographic locations (e.g., within the same retail location or across various retail locations for a common retailer). However, for the purposes of brevity and clarity, only two instances of computing device 102 are shown in FIG. 1.

Computing device 102 may include appropriate hardware (e.g., circuitry, processors, memory, user input devices, display devices, etc.) for implementing algorithms or software applications, for example browsing application 104 or any other suitable algorithm or software application (e.g., an operating system, a web browser, a point-of-sale transaction browsing application, etc.).

Computing device 102 may be coupled to a storage device, such as application server 108 or any other suitable storage device. Database 106 may be implemented on application server 108 or on any other suitable device. Database 106 may be, for example, any number of multi-tiered databases for storing item information and images. In some embodiments, not shown, database 106 may be implemented as part of computing device 102, or part or all of database 106 may be implemented on both computing device 102 and application server 108.

In FIG. 1, browsing application 104 is implemented on computing device 102 while database 106 is implemented by application server 108. It will be understood, however, that the application(s) used in connection with the present invention may be implemented by any device or combination of devices included as part of hardware and software 100 and that the single embodiment of FIG. 1 is used merely as an illustration. For example, in one embodiment, such as the case of a perfectly distributed network (e.g., a thin-client computing arrangement, an application service provider arrangement, etc.), as is typical in a physical or virtual retail environment, all software applications may be implemented by application server 108, or any other suitable device (e.g., a mainframe computer, a supercomputer, etc.), while computing device 102 may only include a user-interface (e.g., a user input device, a display screen, etc.).

Database 106 may reside locally (e.g., as part of computing device 102, at the same retail location as computing device 102, etc.), or at a location remote from computing device 102 and accessed via network 110. Computing device 102 may be coupled to network 110 via communications paths 112 and 114. Network 110 may be a local or wide area network (e.g., the Internet, an intranet, etc.) and may support any combination of wired, wireless, or optical communications.

The hardware and software configuration of FIG. 1 may also include one or more external data sources 122, which may be web servers or any device or combination of devices for storing information. External data sources 122 may be coupled to network 110 via communications paths 124 and 126. External data sources 122 may also be coupled directly to browsing application server 108 via communications paths 128 and 130. The information stored in external data sources 122 may be accessed by application server 108 or computing device 102. It will be understood that the two instances of external data sources 122 are for illustrative purposes and that many instances of external data sources may also be used.

Communications paths 112, 114, 116, 124, 126, 128, and 130 may be any suitable wired or wireless communications path. For example, if wire-based, communications paths 112, 114, 116, 124, 126, 128, and 130 may be serial connections, parallel connections, telephone cables, copper wire, electric cable, fiber optic cable, coaxial cable, Ethernet cable, USB cable, FireWire cable, component video cables, composite cables, any other suitable wire-based communications path, or any combination thereof. If wireless, any suitable communications protocol or standard such as IEEE 802.11, wireless browsing application protocol (WAP), radio frequency (RF), Bluetooth, (Extended) time division multiple access (TDMA), code-division multiple access (CDMA), global systems for mobile communications (GSM), or any other suitable wireless communications path or protocol may be used. A combination of wired and wireless communication paths may also be used. Communications paths 112, 114, 116, 124, 126, 128, and 130 may provide access to network 110 via a web server, a network gateway, any other suitable device, or a combination thereof.

The software and hardware 100 illustrated in FIG. 1 may be used to implement the systems and methods of the present invention. For example, a user may operate computing device 102 to access browsing application 104. Browsing application 104 may include any browsing application that allows a user to access content from database 106. For example, browsing application 104 may present a series of interactive display screens that allows users to navigate content provided by database 106.

The information stored in database 106 may include item information such as color, pattern, material, size, price, manufacturer or brand, weight, or any other suitable attribute that describes an item. Database 106 may also store automatically derived analytical metrics that describe properties of a stored image of an item (e.g., pattern, geometry, outline, etc.), or externally derived information (e.g., historical sales data, profitability and/or cost data, competitive information, customer survey information, etc.), comments about an item, or any other suitable information. The information stored in database 106 may be in any suitable data management format, environment, or application, for example a relational database format, an object oriented database format, a data warehouse, a data directory, a knowledge management system, or any other suitable format, environment or browsing application for storing and indexing related information.

FIG. 2 shows an illustrative table for storing retail item information in database 106. FIG. 2 shows that each item may be stored as a record and that associated item attribute information may also be stored and logically related to the item. For example, table 202 includes stored retail items 204-209 and information fields for storing information associated with each stored item (e.g., description 212, color 214, material 216, price 218, pattern 220, and style 222). Table 202 may also include an item identifier 210 which may be associated with a specific item. Database 106 may store more that one instance of information in an information field. For example, color 214 may include information describing an item as "blue" and as "green" if the item is both blue and green. Alternatively, the item may be described as "blue & green".

It will be understood that table 202 may include additional information fields for storing descriptive attributes associated with the stored item, for example, the item's size, manufacturer or brand, weight, any other suitable descriptive characteristic or a combination thereof. Table 202 may also include automatically derived analytical metrics that describe properties of a stored image of an item (e.g., pattern, geometry, outline, etc.), or externally derived information (e.g., historical sales data, profitability and/or cost data, competitive information, customer survey information, etc.), comments about an item, or any other suitable information. It will also be understood that table 202 may include many more item records than the listed items 204-209. For the purposes of clarity and brevity, only a select number of items and item information fields are provided in FIG. 2.

FIG. 2 may also include an information field for storing image information 224 for one or more images of a given retail item. Image information may include the actual image (e.g., in the case of a multimedia database) or an indexed link indicating a location for the stored image. Stored images may be actual photos, drawings, sketches, models, or other representations or an item and may be 2-dimensional or 3-dimensional in nature. The images may be in a static format, an animated format, a cinematic format, or any other suitable presentation format. Image information may be stored as any suitable graphic file format. For example file types such as .avi, .cam, .dcx, .gif, jpeg, .pbm, .pdf, .raw, .rip, .svg, .tiff, .web, or any other suitable graphical file format may be used to store the image information.

The information stored in database 106 may be entered manually, downloaded from another source, or obtained via any other suitable method or combination of methods. In one arrangement, the information may be captured via automated image detection and analysis hardware and software that may be used to automatically determine descriptive attribute information (e.g., color, size, shape, pattern, etc.) of an item using a sample of the item (e.g., an image of the item or a physical specimen of a desired item). The descriptive attributes may include geometry, color, categorical descriptors, purely mathematical descriptors, or any other suitable attribute information. Fully automated image detection and analysis, which is important for implementation in a large item database environment, may be achieved using known systems and methods for detecting and storing descriptive information of an item automatically determined from a sample (e.g., image or physical specimen) of an item. For example, histograms of color usage may be used in conjunction with edge detection techniques to determine the color, number, and orientation of lines and curves in an item's pattern. Outline processing techniques may be used to automatically determine an item's overall shape. Sleeve length, collar type, and other item attribute information may also be determined using known automatic image detection and analysis techniques.

A user may use browsing application 104 to access the information stored in database 106. The browsing application may be implemented in conjunction with a standard web browser application (e.g., Microsoft's Internet Explorer, Netscape Navigator, etc.) and accessed over the Internet. Alternatively, browsing application 104 may be implemented in conjunction with a proprietary or commercially available software application interface accessed locally (e.g., in an arrangement using an exit kiosk as computing device 102). Any suitable arrangement for configuring computing device 102 to access database 106 using browsing application 104 will suffice. User input devices, such as a mouse, keyboard, a touch-sensitive display screen, or any other suitable user input device, may be used to interact with the browsing application and may be included as part of computing device 102. Display devices such as a computer monitor, a handheld display, or any other suitable device, may be used to present display screens of information to the user and may be included as part of computing device 102.

Figure 3:
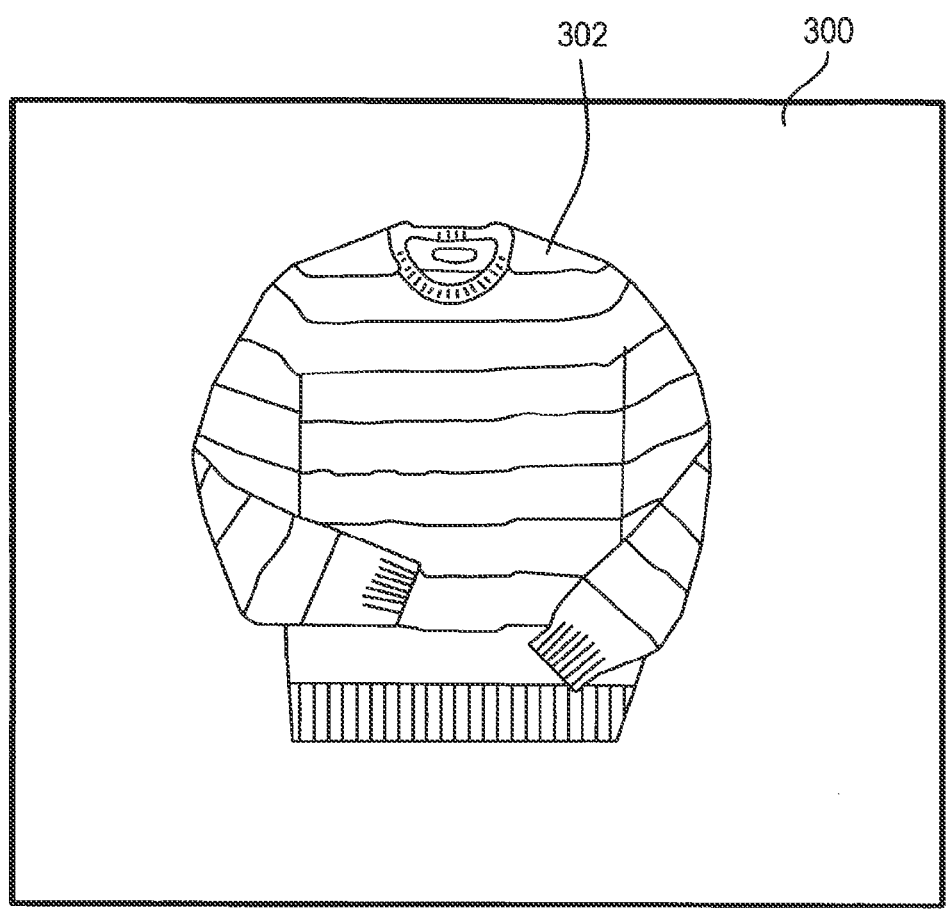
FIGS. 3-10 show illustrative display screens for allowing users to navigate image-based content in accordance with the present invention.

FIGS. 3-10 show various displays illustrating how information stored in database 106 may be presented, navigated, and retrieved by a user of browsing application 104. FIG. 3 shows an image 302 of an item stored in database 106 (e.g., item 204 of FIG. 2) being displayed as part of display screen 300. Because image information is stored in table 202 with associated item information (e.g., color, type, style, etc.), image 302 is also associated with the item-related information. For example, image 302 may be associated with attributes describing the item's material as cotton, pattern as striped, color as blue and green, etc. Display screen 300 is provided here as an illustrative example of an item image being displayed that includes underlying descriptive attributes stored in database 106 which are not displayed but are associated with the image.

Figure 4:
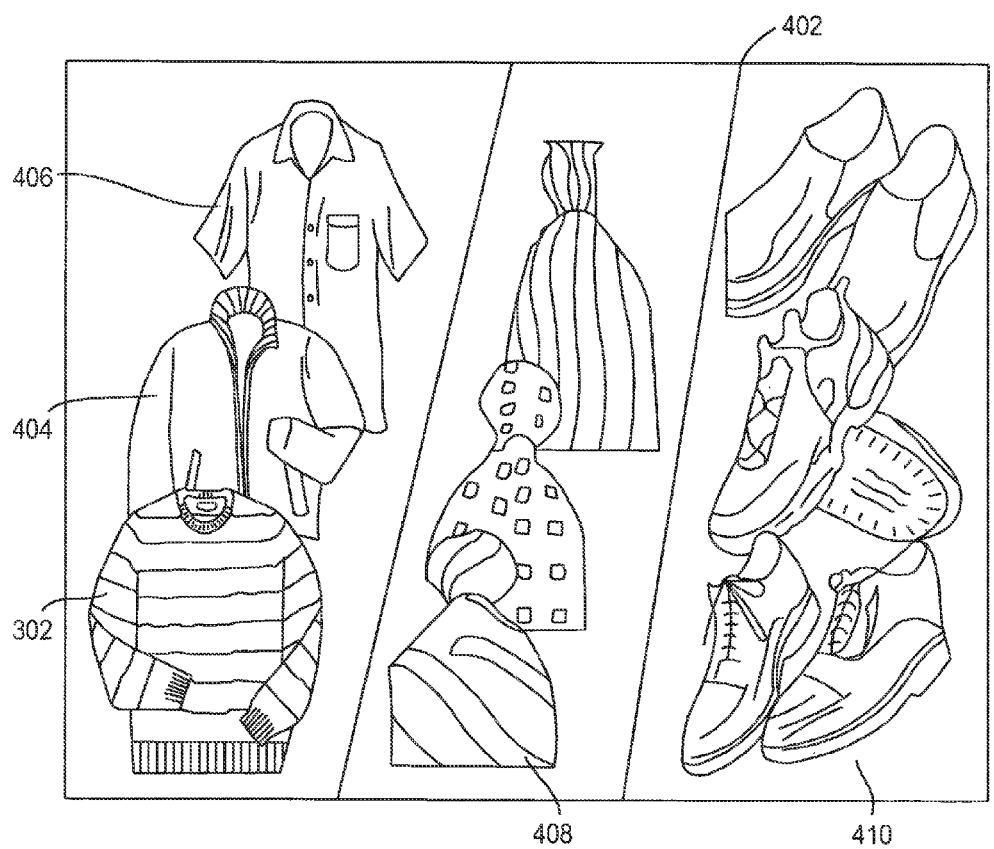

Display screen 402 of FIG. 4 shows an illustrative display screen that may be used to present images of various retail items to a user of browsing application 104. Display screen 402 may be the initial display screen provided to a user and may include various displayed item images from which the user may select an item of interest. The images may be grouped together and presented according to item categories, for example a men's clothing item category as depicted in display screen 402. Display screen 402 shows images of men's tops (e.g., shirt 406, coat 404, and sweater 302), ties 408, and men's footwear 410. Images of related items (e.g., men's tops) may be grouped and displayed together (e.g., in a common row, column, cluster, etc.). It will be understood that display screen 402 may not be the initial display screen provided to the user and that the images or groups of images may be distinguished from one another at a higher level than is shown in display screen 402. For example, an initial display screen may include images corresponding to various item categories (e.g., clothes, home furnishings, electronics, etc.), and the user may select an image to search within a desired category.

The images of each of the items presented on display screen 402 may be associated with item attributes as stored in database 106. Table 202 of FIG. 2 shows items and item attributes for the images presented on display screen 402. For example, the image of sweater 302 may correspond to image 1.gif 426 of table 202 and may therefore be associated with the item attributes of database record 204. The image of coat 404 may correspond to the image stored in file 2.gif 228 of table 202 and may therefore be associated with the item attributes of database record 205. The image of shirt 406 may correspond to the image stored in file 3.gif 230 of table 202 and may therefore be associated with the item attributes of database record 206.

Figure 5:
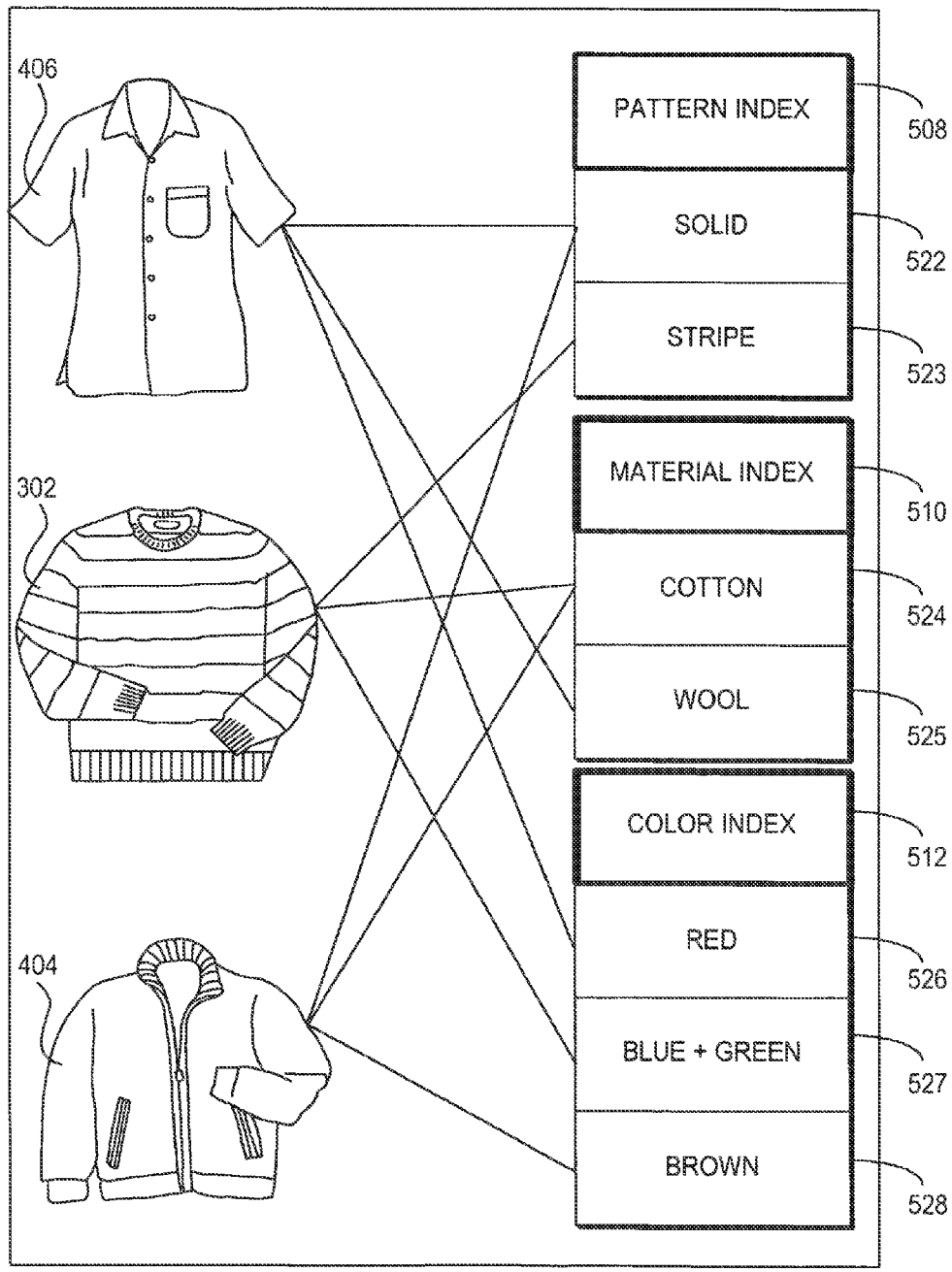

In one approach, an index may be generated for each of the information fields of table 202 that describe item attributes (e.g., color 212, material 216, pattern 220, etc.). For example, FIG. 5 shows that sweater 302, coat 404, and shirt 406 may be associated with indexed attributes such as pattern index 508, material index 510, and color index 512. Each of the indices may include variables assigned to a particular image. For example, the variables listed in pattern index 508 may be solid 522 or stripe 523, the variables in the material index 510 may be cotton 524 or wool 525, and the variables in the color index 512 may be red 526, blue and green 527, or brown 528. The attribute indexes may be generated on the fly (e.g., in real time as the user searches for items using specific search criteria and operations) or may be stored in databases 106 and associated with table 202. It will be understood that many more variables may be associated with each of the indexes shown in FIG. 5 and that additional indexes may also be generated and used.

Referring again to FIG. 4, a user may select an image or group of images to find a similar item or group of items (e.g., the user may select the portion of a display screen on which the selected item is displayed using a touch-sensitive screen, the user may navigate a pointer to the image and select the image using a mouse, keyboard, or using any other suitable input device). For example, browsing application 104 may use search parameters to search for similar items stored in database 106 when a user selects an image or group of images. The search parameters used by browsing application 104 to search for similar items may be the attributes associated with the selected image or images (e.g., color, material, pattern, etc.).

If a user selects more than one item image (e.g., if the user selects an image of a group or cluster of items), browsing application 104 may use the attributes that are common to all items as the search parameters for finding similar items. Browsing application 104 may search for similar items using any available search command or algorithm, and by inserting search parameters and executing the search commands according to selections by the user.

A proximity searching technique may be used by browsing application 104 to search for and retrieve items that are most similar, but not identical, to the selected item. For example, browsing application 104 may calculate some measure of distinction between items in terms of descriptive item characteristics (e.g., color, pattern, material, size, price, manufacturer or brand, etc.). The measure of distinction may be used to locate similar items. For example, browsing application 104 may calculate the number of common attributes between the selected item(s) and every other item stored in database 106. Browsing application 104 may also limit the search by excluding obvious non-matching items according to the product category of the selected item (e.g., if the user selects a men's shoe, there is no need to determine the similarity between the selected men's shoe and a coat). The item(s) with the least level of distinction from the selected item(s) may be retrieved from the search and images associated with the retrieved items may be displayed.

From display screen 402 of FIG. 4, a user may select an item or group of items to search for similar items. For example, the user may select the group of items on the left of display screen 402 (e.g., sweater 302, coat 404, and shirt 406) to find similar items. Browsing application 104 may recognize the images selected by the user as being representative of retail items stored in database 106 and may determine item attributes that are common to all three items (e.g. using an indexing scheme as depicted in FIG. 5). Using the common attributes as search parameters, browsing application 104 may search database 106 for similar items.

Figure 6:
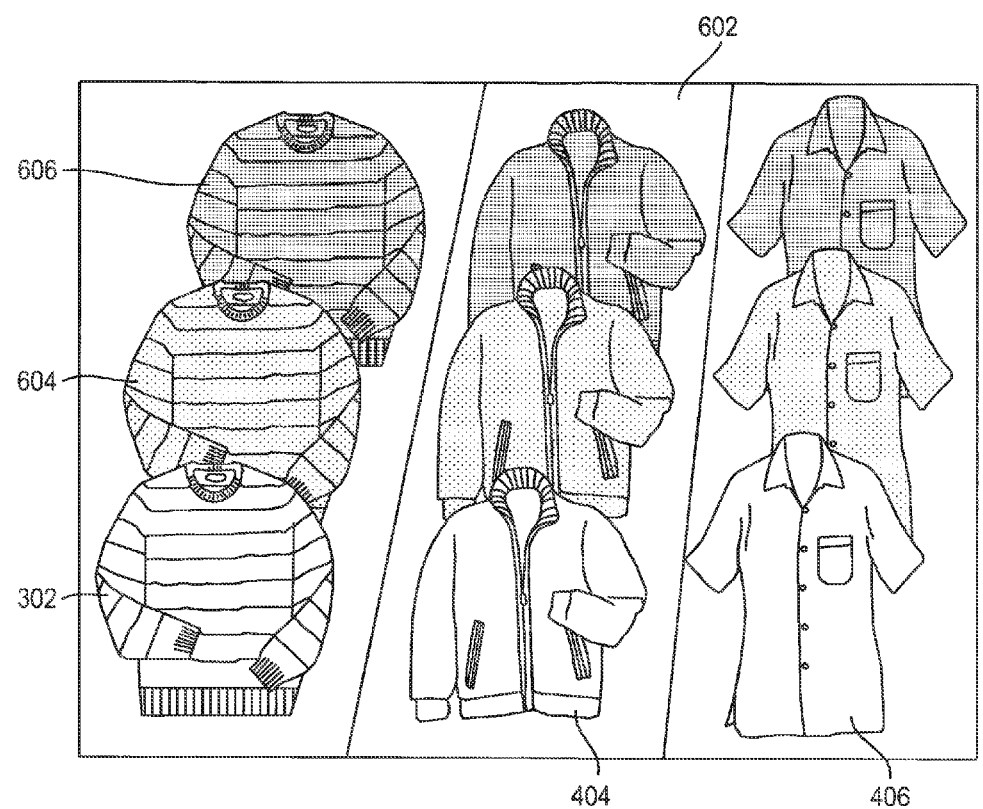

Display screen 602 of FIG. 6 shows items stored in database 106 that have been identified by browsing application 104 as having descriptive attributes most similar to the item(s) selected by the user. For example, display screen 602 includes grey sweater 604 and black sweater 606 that are similar to sweater 302. The image of grey sweater 604 may correspond to the image stored in file 4.gif 232 of table 202 and may therefore be associated with the item attributes of database record 207. The image of sweater 606 may correspond to the image stored in file 5.gif 234 in table 202 and may therefore be associated with the item attributes of database record 208. Display screen 602 also includes images of items similar to the remaining items selected in display screen 402. The user may again select an image or group of images to perform a more detailed search for the related items. The user may continue to search using this method of selecting item images until a final desired item image is presented.

This same example-based proximity searching technique used to search for similar items may be used to group items in a display. For example, in FIG. 6, the item or items selected in display screen 402 may be presented as the primary item or items or interest, and placed in the foreground of display screen 602. Similar items retrieved from the search may be placed in the background as secondary items matched to each of the primary item or items. Once a user has selected a group of items, the primary item in the selected group and the selected secondary items may become the primary items for a subsequent display screen and may be presented in the foreground of the subsequent display. Similar items, retrieved from a search initiated in response to the users' selection of the group of images, may be presented in the background and matched to the primary items of the subsequent display.

Browsing application 104 may detect and store information related to user selections. For example, browsing application 104 may detect and store the frequency at which particular items, or attributes, are selected. Such survey information may be especially useful in assisting a retailer to select items to offer for sale by determining which items and item attributes may be most desirable and which items and item attributes may be least desirable. The user selection information detected by browsing application 104 may be stored in database 106 and may be associated with a particular item (e.g., the rate at which an item's image was selected when presented may be stored in the item's database record).

Because of the vast amount of information that may be stored in a retail item database, it will be understood that various methods may be employed to optimally store, index, search, and retrieve items in the database. For example, a B-tree indexing structure may be used, where decision points ("nodes") have two or more "branches" for logically identifying a database record. An Indexed Sequential Access Method (ISAM) or Virtual Storage Access Method (VSAM) may also be used, where records are accessed either sequentially (e.g., in the order they were entered) or randomly (e.g., with an index). In an ISAM or VSAM, each index defines a different ordering of the records. A Cube index may also be used to index and retrieve retail item information. A cube is an online analytical processing method that searches content by creating intersections of numerous dimensions, where the dimensions act as indices and include keyed data records.

The optimum index structure for a given item database may vary depending on the number of items in the database and the number of descriptive parameters used to locate each of these items. The item database is typically organized in a tree-type structure, with the indexed keys being common item characteristics such as color, pattern, material, size, price, manufacturer or brand, or weight values representing visual characteristics of item images, any other suitable descriptive characteristic or a combination thereof. The tree-type indexing structure allows users to retrieve database content quickly and easily with a minimum number of index accesses. As the item database grows larger, and as more parameters describing each item are used, tree-type index searches may become slower, and other index types may be employed (e.g., cube indices, sequential indices, etc.). In addition, a tree-type index is designed for direct-match searching, whereas the present invention is directed to exact and non-exact matches. However, for smaller item databases, a tree-type structure may generally be used and adapted for non-exact searching matches. It will be understood that any suitable technique or combination of techniques for storing, indexing, searching, or retrieving information may be used.

Figure 7:
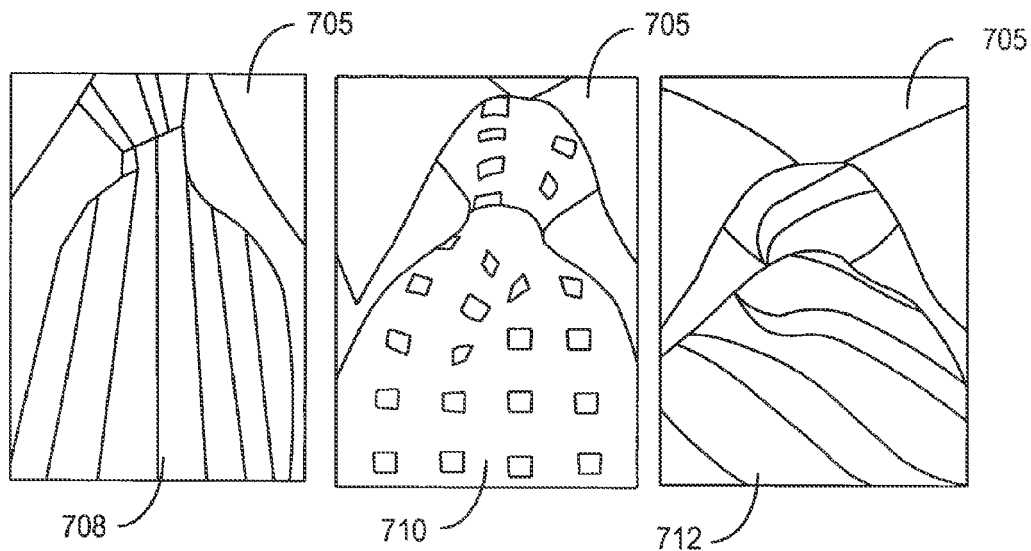

In another aspect of the present invention, browsing application 104 may present item images in a variety of ways to enhance a user's virtual retail experience. For example, once the user has searched for a desired item and the item image is retrieved from database 106, the item image may be used to assist the user in searching for complementary items. In the illustrative example of FIG. 7, after the user has found a shirt 705 of interest, browsing application 104 may present the image of shirt 705 to assist the user in selecting a tie. This may be done, for example, using blue screen technologies and other known automatic image synthesis and editing techniques that superimpose images to produce a combined image having elements of each superimposed image. In FIG. 7, the images of ties 708, 710, and 712 have been superimposed on top of multiple instances of the selected image of shirt 705 so that the user is able to view the items together with the same image in the same display screen to determine the most appropriate combination.

Figure 8:
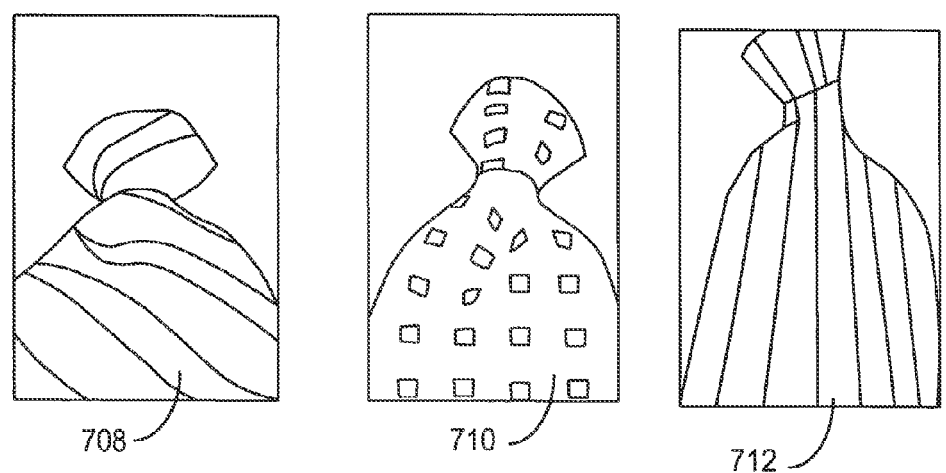

FIG. 8 shows that the superimposed image can be easily removed such that the images of ties 708, 710, and 712 can be viewed without the image of shirt 705. Blue screen technologies and other known automatic image synthesis and editing techniques may be used to add and remove complementary item images as needed. For example, the user may use browsing application 104 to perform example-based proximity searches using item attributes with or without an additional image or images.

In another aspect of the present invention, the item image used to commence the user's search may not be stored in database 106. Instead, the user may use browsing application 104 to generate an image having specific attributes (e.g., color, size, type, style, etc.) selected by the user that visually describe a desired item. The descriptive attributes of the generated image may be used with search parameters provided by the user (e.g., price, material, etc.) to perform example-based proximity searching as previously described. For example, a user searching for a shirt can be presented initially with an empty outline of a shirt. Browsing application 104 may present the user with selectable attribute options, allowing the user to select desired image attributes (e.g., fabric, pattern, collar type, sleeve length, number of pockets/buttons, etc.) as well as other information (e.g., price ranges, care requirements, manufacturer or brand, etc.). Any other suitable attribute may also be used. Browsing application 104 may use these attributes to generate an image of the desired item. Browsing application 104 may then use example-based proximity searching to locate stored items that are similar to the user's specification.

Figure 9:
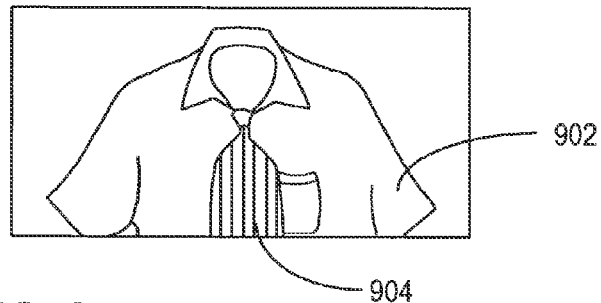
Figure 10:
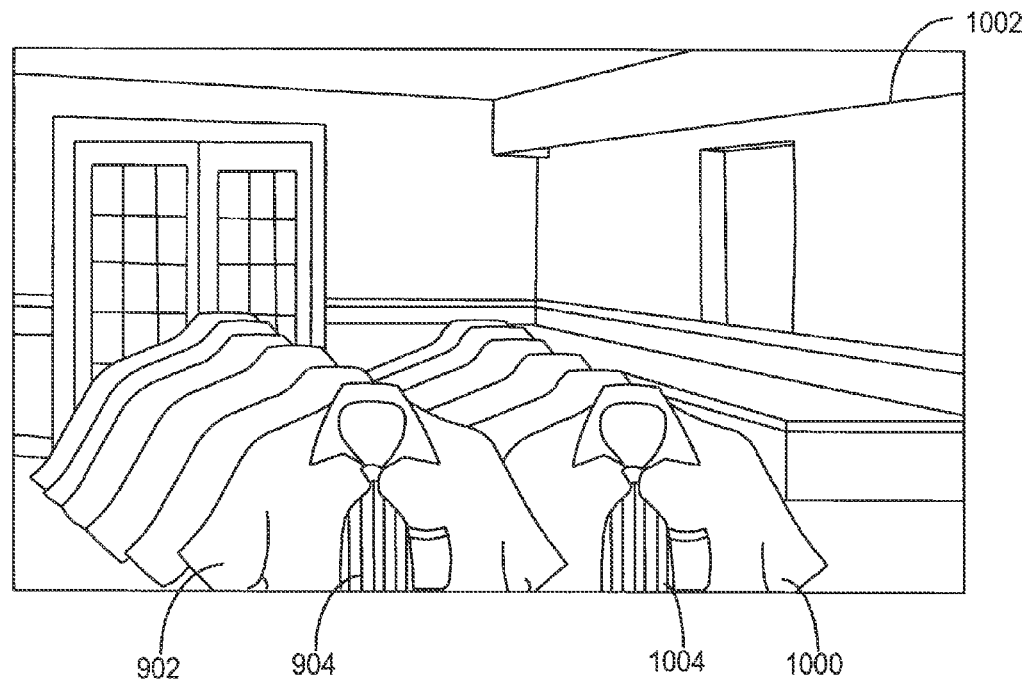

In addition, browsing application 104 may also allow users to supply fabric samples, photos of other items, sketches, or other information to define and search for a desired item. Automatic image detection and analysis hardware and software may be implemented on computing device 102 (FIG. 1) for receiving the required information from the user. For example, FIG. 9 shows an image of shirt 902 and tie 904 which may have been derived from image input received from the user via automatic image detection and analysis technologies and techniques. In FIG. 10, the image may be superimposed on an image of a retail sales floor 1002 using blue screen technology in conjunction with other known image synthesis and editing technologies and techniques. Variations of shirt 902 and tie 904 may then be generated (e.g., variations on color, fabric, etc.) and presented in the same display in order to provide the user with the familiar physical store retail experience in a virtual retail space.

To assist the user in defining a desired item's characteristics, or to prompt the user with suggested possibilities, computing device 102 and browsing application 104 may include additional hardware and software for implementing the "Travesty Algorithm," or a similar algorithm. The Travesty Algorithm is a known algorithm that may be used to combine multiple samples of existing items to generate new items which bear some resemblance to existing items, but which are distinct from the existing items. Such an algorithm may be used to produce large numbers of variations on a design "theme" or to assist the user in defining particular preferences. For example, the algorithm can rapidly generate numerous shirt designs based on the design of an existing shirt, but with variations in color, pattern, cut, fabric, or any other suitable attribute or combination of attributes. A shirt may also be generated using information about other shirts or from basic material catalogs.

In addition, computing device 102 and browsing application 104 may include software and hardware for implementing the "Conjoint Algorithm," or a similar algorithm, for determining user preferences over a range of merchandise properties and assigning a preference value for each property. The Conjoint Algorithm is a known algorithm which may be used to determine the user's preferences with regard to price, material, color, style, care requirement, manufacturer or brand, or any other suitable attribute or combination of attributes and to determine the user's preference level of one attribute compared to another attribute and the rate at which the user is willing to compromise or trade-off one item attribute for another item attribute. This information may be used to extend the database search by, for example, including items that are made of a preferred material, but which are higher priced (rather than lower priced).

The user's search may result in determining and displaying an actual inventoried item that meets the user's criteria and which the user may purchase. However, the item retrieved may also be a specification for a custom item to be manufactured specifically for the user. For example, the user may indicate one or more shirts of interest, add additional specifications beyond those illustrated by available stored items, and the resulting composite design may be used to generate a unique shirt specifically for that user.

Figure 11A:
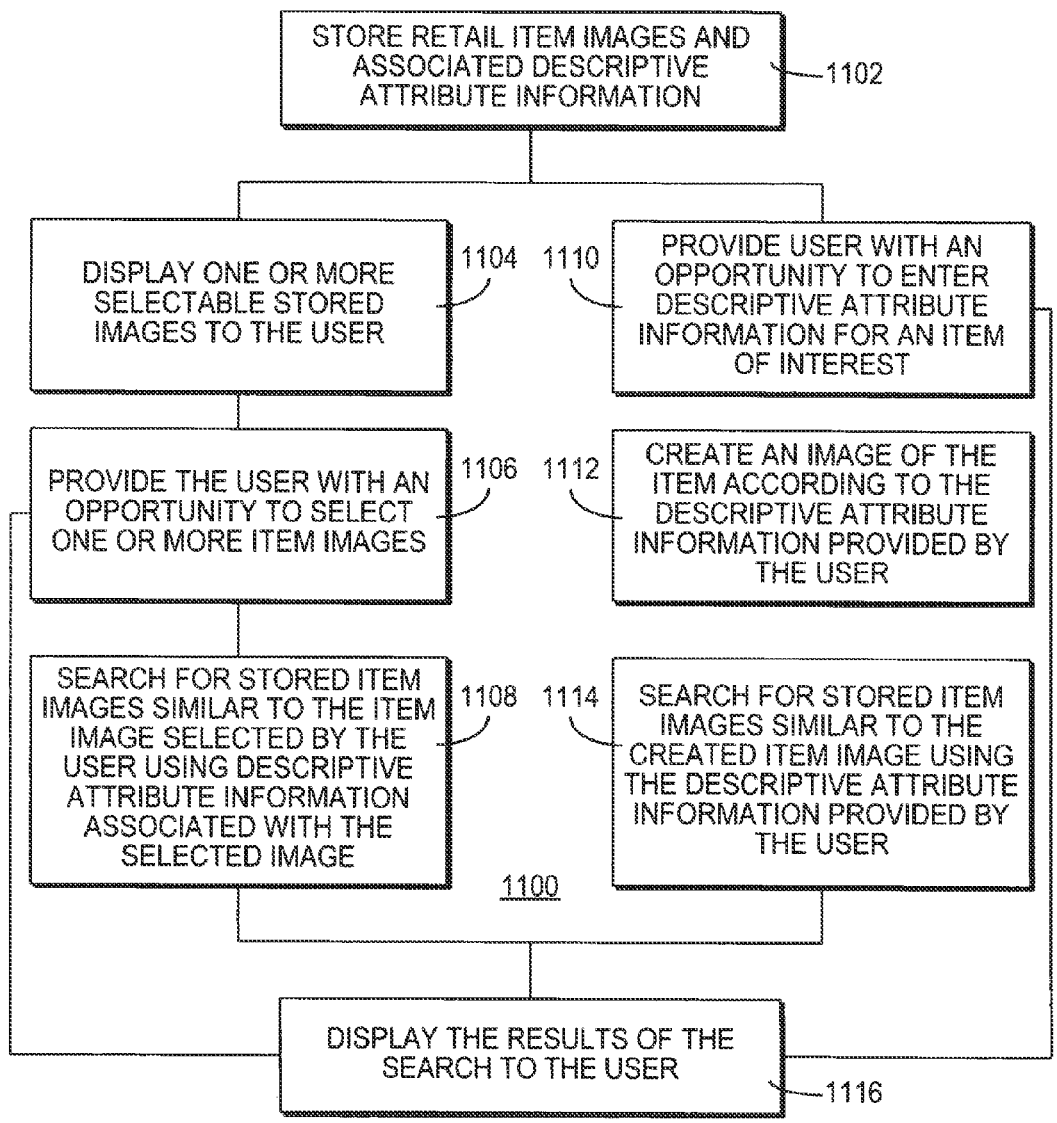
FIGS. 11a and 11b are flow charts of illustrative steps involved in allowing users to navigate image-based content in accordance with the present invention.

A flow chart 1100 of illustrative steps that may be involved in allowing users of browsing application 104 to search for items of interest is shown in FIG. 11a. At step 1102, retail item images and descriptive attribute information associated with the items or images may be stored (for example in database 106 or any other suitable storage device or combination of devices). The images and associated attribute information may be stored in any suitable indexing format and logically related to the stored image, the database record of the item, or both. The descriptive attribute information may be derived from information describing the item (e.g., from an item database), or the descriptive attribute information may be derived from a sample (e.g., image or specimen) of a desired item using, for example, known automatic image detection and analysis technologies and techniques. In some instances, item images and associated attribute information may be provided by users and stored in the database. At step 1104, browsing application 104 may display one or more selectable stored item images to the user. Alternatively, browsing application 104 may provide the user with an opportunity to enter descriptive attribute information associated with a desired item at step 1110.

If browsing application 104 displays one or more selectable stored images to the user at step 1104, browsing application 104 may provide the user with an opportunity to select an image or group of images from the display at step 1106. The user may select the image or images using any suitable input device, such as a mouse, keypad, touch-sensitive display screen, etc. At step 1108, browsing application 104 may search for stored item images similar to the item image or images selected by the user. Browsing application 104 may use the descriptive attribute information of the image or images selected as the search parameters needed to perform the search. At step 1116, the results of the search may be displayed to the user (e.g., similar item images may be displayed to the user). After results are displayed, the user may further refine the search at step 1106 and proceed in accordance with the foregoing method.

If browsing application 104 provides the user with an opportunity to enter descriptive attribute information for an item of interest at step 1110, browsing application 104 may prompt the user to select attribute options. Or, browsing application 104 may otherwise prompt the user to provide attribute information using, for example, known automatic image detection and analysis technologies and techniques for detecting descriptive attributes provided by the user (e.g., allowing the user to provide a sample of a desired item or items). Browsing application 104 may generate an item image using known image synthesis technologies based on the descriptive attribute information provided by the user at step 1112. At step 1114, browsing application 104 may search for stored images similar to the generated image. Browsing application 104 may use the descriptive attribute information provided by the user, and used to generate the image, as the search parameters needed to perform the search. At step 1116, the results of the search may be displayed to the user (e.g., similar item images may be displayed to the user). Once the results of the search are displayed, the user may proceed to revise the attribute information (e.g., according to step 1110), or the user may proceed to step 1106 to select images and further refine the search.

Browsing application 104 may provide the user with various options once the user indicates that a specific item of interest has been located. For example, in an online retail environment using a personal computer as computing device 102, the user may be provided with an opportunity to purchase a displayed item (e.g., using a credit card or other payment authorization). In a physical store using a kiosk as computing device 102, browsing application 104 may provide the user with the physical location (e.g., within the store) of a displayed image. Alternatively, or in addition to these options, browsing application 104 may provide the user with an opportunity to search for additional (e.g., complementary) items using a displayed item image of interest.

Figure 11B:
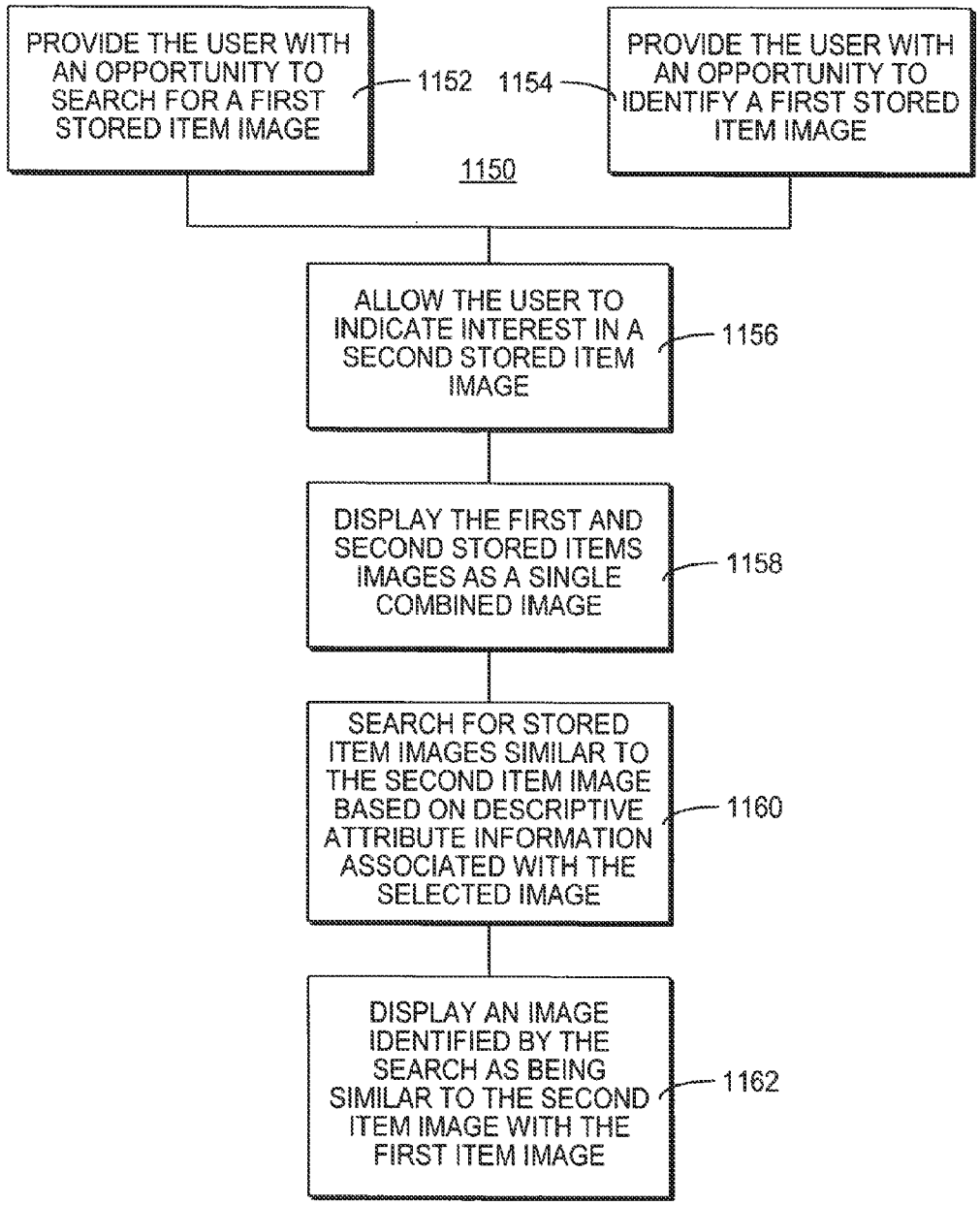

A flow chart 1150 of illustrative steps that may be involved in allowing users of browsing application 104 to search for items that complement a first item using the image of the first item is shown in FIG. 11b. At step 1152, browsing application 104 may provide a user with an opportunity to search for a first stored item image. This may be accomplished, for example, using the steps set forth in flow chart 1100 of FIG. 11a. Alternatively, at step 1154, browsing application 104 may provide the user with an opportunity to identify a first stored item image using a method other than searching for a specific item image. For example, the user may identify a generic white dress shirt.

When a desired first item image is displayed, browsing application 104 may provide the user with an opportunity to indicate interest in a second stored item image at step 1156. This may be done, for example, by prompting the user to select an item image that compliments the first item (e.g., if the first item is a white dress shirt, the second, complementary item may be a tie). At step 1158, browsing application 104 may display the first and second stored item images as a single combined image, for example by superimposing at least part of the first or second stored item image over the respective second or first stored item image.

At step 1160, browsing application 104 may provide the user with an opportunity to search for stored item images similar to the second item image based on descriptive attribute information associated with the second item image (e.g., using the process set forth in flow chart 1100 of FIG. 11a). At step 1162, browsing application 104 may display an image identified by the search as being similar to the second item image with the first item image. This allows users to mix, match, and compare complementary items using browsing application 104.

The foregoing systems and methods for navigating and searching database content using image-based attributes may also be applied to other virtual environments. For example, browsing application 104 may be modified to function as a web browsing application (e.g., having software and hardware for implementing the forgoing image-based navigation techniques). In the context of a web browser implementation, the present invention differs from the traditional (and virtually universal) Mosaic model of web browser design. In the Mosaic model, although the World Wide Web itself may be visually driven, operation of the browser application is primarily text-based. For example, users typically navigate web pages by clicking on images or portions of images using an input device (e.g., a mouse), which allows the Web to be driven visually rather than textually. However, operation of the web browser remains text-based, as lists of favorite or recently visited web pages and web page addresses are presented textually, and are often ordered in a time-sequential manner. Accordingly, the task of accessing a web page previously accessed includes backing up through a sequence of recently viewed pages and reviewing lists of cryptic web addresses or shorthand names that the user may have assigned to a particular web page.

Figure 12:
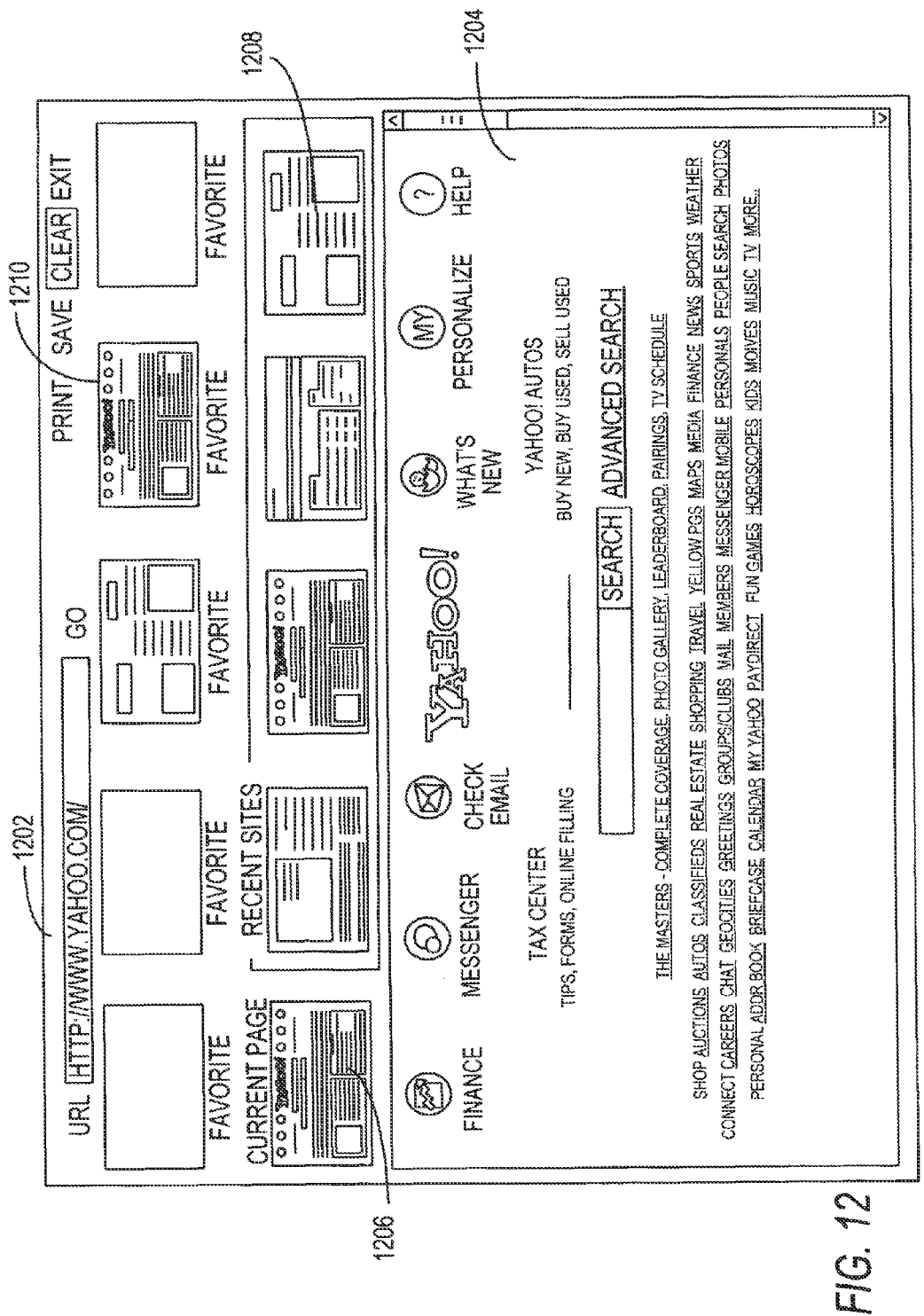
FIG. 12 shows an illustrative arrangement of a web-browser that allows users to navigate image-based content in accordance with the present invention.

FIG. 12 shows an illustrative example of how textual listings of addresses for various web pages (e.g., favorite web pages, recently viewed web pages, etc.), may be replaced by reduced-size images of the web page. In FIG. 12, browsing application 104 may present display screen 1202, which includes a window 1204 for displaying a web page using known web-based browsing functionality (e.g., retrieving and presenting web pages coded using Hypertext Markup Language (HTML), Extensible Markup Language (XML), Java, any other suitable web-based programming language, or a combination thereof). Browsing application 104 may generate and store a reduced-size image of each web page accessed and presented in window 1204. Each reduced-size web page may be stored and associated with a stored address corresponding to the web page.

Display screen 1202 may also include reduced-size images for recently accessed web pages 1208 and one or more web page designated by the user as a favorite 1210. A reduced-size image may also be generated for the current page 1206 being accessed and presented in window 1204. The user may re-access any of the recently viewed or favorite web pages by selecting the reduced-size image of the web page. Browsing application 104 may access the desired web page at the address associated with the selected reduced-size image and display the web page within window 1204.

The reduced-size web page images may be static, presenting only the appearance of the relevant web page from the most recent visit. The reduced-size web page images may also may be dynamically updated in a periodic fashion (e.g., as a background function performed by browser application 104), such that the browsing application continues to access and update the current appearance of the reduced-size web page image regardless of whether the page is being directly accessed by the user and displayed in window 1204.

The reduced-size web page images may be fixed in position on display screen 1202, or the images may be animated in some fashion to alter the position of the images on display screen 1202. For example, multiple reduced-size images may be presented as a scrolling sequence of images across one edge of the display (e.g., a "film-loop" animation), thus presenting the user with a sequence of images in a cyclic manner. This minimizes the display area occupied by the reduced-size images while preserving the number of reduced-size images that may be displayed.

The reduced-size images may include images of web pages not directly accessed by the user. For example, browsing application 104 may automatically generate a reduced-size image for non-requested content (e.g., pop-up advertisement, web-pages received from other users via e-mail, etc.) as it is transmitted to and received at computing device 102. A link to the non-requested content may be stored and associated with the reduced-size image of the non-requested content. The reduced-size image may be displayed for the user to view and access. This allows browsing application 104 to display non-requested content to the user while allowing the user to browse and monitor non-requested content without being overly distracted by the non-requested content.

Figure 13:
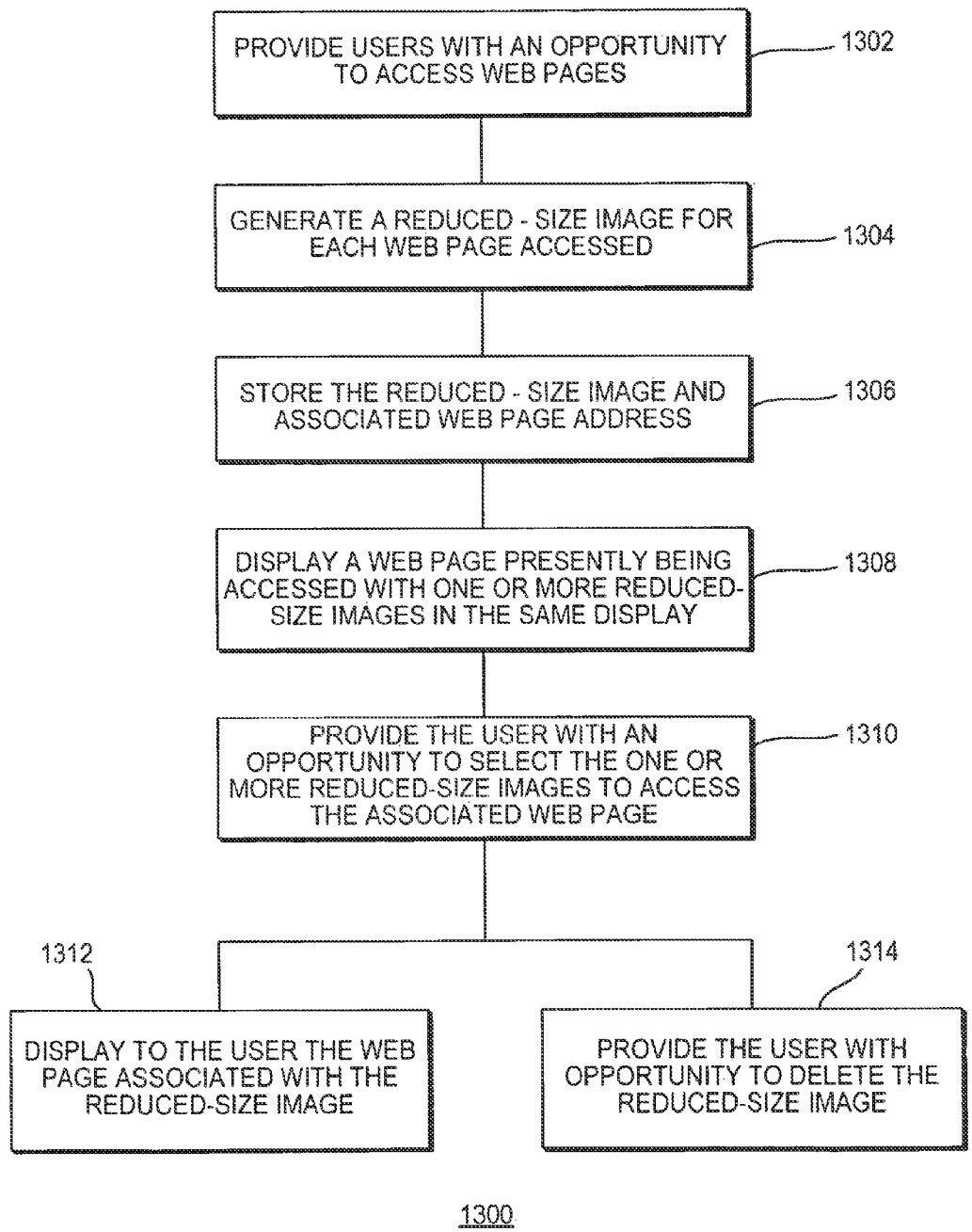
FIG. 13 is a flow chart of illustrative steps that may be involved in allowing users of a web browser to navigate image-based content in accordance with the present invention.

A flow chart 1300 of illustrative steps that may be involved in allowing users of browsing application 104 to browse the World Wide Web (or any other content) is shown in FIG. 13. At step 1302, browsing application 104 may provide users with an opportunity to access web pages over the Internet. This may be accomplished using any number of known techniques for accessing web pages and content using a conventional web browser. At step 1304, browsing application 104 may generate a reduced-size image of a web page as the web page is accessed. This may be done, for example, using screen-content or screen scraping technologies and techniques or using any other known automatic image detection, analysis, synthesis, or editing technologies and techniques.

At step 1306, browsing application 104 may store the reduced-size image and the associated web page address in any suitable storage device (e.g., database 106, computing device 102, etc.). At step 1308, browsing application 104 may display a web page presently being accessed by the user in addition to at least one selectable reduced-size image. The reduced-size image may represent the web page currently being viewed, web pages recently viewed, web pages designated as favorites, or non-requested web pages transmitted to the user.

At step 1310, browsing application 104 may provide the user with an opportunity to select a reduced-size image. The user may be provided with an opportunity to perform various actions associated with the selected image. For example, the user may be provided with an option to direct browsing application 104 to access the stored web page address associated with the reduced-size image and display the web page in window 1204. Alternatively, the user may be provided with an option to direct browsing application 104 to update the reduced-size image with the most recent content. Or, the user may be provided with an option to direct browsing application 104 to delete the reduced-size image and prevent the reduced-size image from being displayed in display screen 1202. Browsing application 104 may automatically update a reduced-size image (e.g., at a specified time interval, when the content has changed, etc.) and may automatically delete a reduced-size image (e.g., at a specified time interval, when the image has not been selected by the user for a specified period of time, etc.).

At step 1312, browsing application 104 may access the web page address and present to the user the web page associated with the selected reduced-size image of the web page. Alternatively, at step, 1314, browsing application 104 may provide the user with an opportunity to delete the reduced-size image such that the image will no longer be displayed.

The foregoing is merely illustrative of the principles of this invention and various modifications may be made by those skilled in the art without departing from the scope and spirit of the invention. It will be understood that the values determined in conjunction with the systems and methods of the present invention may be calculated using statistical and mathematical methods, models, and formulas other than those described herein, and that the foregoing description is merely illustrative of the principles of the invention. Those skilled in the art will appreciate that the present invention may be practiced by other than the described embodiments, which are presented for purposes of illustration and not of limitation, and the present invention is limited only by the claims.

What is claimed is:

1. A method for allowing a user of a browsing application to navigate image-based content using a graphical user interface, the method comprising:
    storing a plurality of images, wherein each image depicts an item;
    analyzing a first image of the plurality of images to detect attribute information associated with a first item depicted in the first image, wherein the attribute information comprises a plurality of categories, including a color category;
    storing the attribute information;
    receiving a user selection, from a user, of the first image depicting the first item;
    calculating a measure of distinction between the first item and a second item based on the plurality of categories, wherein the measure of distinction represents an alignment of categories between the first and second items;
    determining the second item to be similar to the first item if the measure of distinction satisfies a criterion; and
    displaying a second image of the plurality of images depicting the second item.

2. The method of claim 1, wherein the attribute information is derived from a sample of a desired item.

3. The method of claim 2, further comprising:
    generating an image based on the sample.

4. The method of claim 3, further comprising:
storing the generated image.

5. The method of claim 1, wherein calculating the measure of distinction comprises a proximity search using the stored attribute information as criteria for performing the proximity search.

6. The method of claim 2, further comprising:
providing the user with an opportunity to further refine the proximity search.

7. The method of claim 1, further comprising:
displaying a plurality of stored images; and
allowing the user to indicate interest in the first image by selecting the first image from the plurality of stored images.

8. The method of claim 7, further comprising:
displaying one or more groups of stored images; and
allowing the user to indicate interest in the first image by selecting a group of stored images.

9. The method of claim 7, wherein the one or more groups of stored images are at least partially overlaid on a third image.

10. The method of claim 1, further comprising:
providing the user with an opportunity to create an image based on desired attribute information.

11. The method of claim 1, further comprising:
providing the user with an opportunity to purchase an item associated with the second image.

12. A system for navigating image-based content using a graphical user interface, the system comprising:
means for storing a plurality of images, wherein each image depicts an item;
means for analyzing a first image of the plurality of images to detect attribute information associated with a first item depicted in the first image, wherein the attribute information comprises a plurality of categories, including a color category;
means for receiving a user selection, from a user, of the first image depicting the first item;
means for calculating a measure of distinction between the first item and a second item based on the plurality of categories, wherein the measure of distinction represents an alignment of categories between the first and second items;
means for determining the second item to be similar to the first item if the measure of distinction satisfies a criterion; and
means for displaying a second image of the plurality of images depicting the second item.

13. The system of claim 12, wherein the attribute information is derived from a sample of a desired item.

14. The system of claim 13, further comprising:
means for generating an image based on the sample.

15. The system of claim 14, further comprising:
means for storing the generated image.

16. The system of claim 12, wherein the means for calculating the measure of distinction comprises means for performing a proximity search using the stored attribute information as criteria for performing the proximity search.

17. The system of claim 16, further comprising:
means for providing the user with an opportunity to further refine the proximity search.

18. The system of claim 12, further comprising:
means for displaying a plurality of stored images; and
means for allowing the user to indicate interest in the selected stored first image by selecting the image from the plurality of stored images.

19. The system of claim 18, further comprising:
means for displaying one or more groups of stored images; and
means for allowing the user to indicate interest in the selected stored first image by selecting a group of stored images.

20. The system of claim 18, wherein the one or more groups of stored images are at least partially overlaid on a third image.

21. The system of claim 12, further comprising:
means for providing the user with an opportunity to create an image based on desired attribute information.

22. The system of claim 12, further comprising:
means for providing the user with an opportunity to purchase an item associated with the second image.

23. A system for navigating image-based content using a graphical user interface, the system comprising:
a storage device configured for storing:
a plurality of images, wherein each image depicts an item;
a processor configured to:
analyze a first image of the plurality of images to detect attribute information associated with a first item depicted in the first image, wherein the attribute information comprises a plurality of categories, including a color category,
receive a user selection, from a user, of the first image depicting the first item,
calculate a measure of distinction between the first item and a second item based on the plurality of categories, wherein the measure of distinction represents an alignment of categories between the first and second items,
determine the second item to be similar to the first item if the measure of distinction satisfies a criterion; and
a display device configured to display a second image depicting the second item.

24. The system of claim 23, wherein the attribute information is derived from a sample of a desired item.

25. The system of claim 24, wherein the display device presents an image generated using the sample.

26. The system of claim 25, wherein the generated image is stored in the storage device.

27. The system of claim 23, wherein calculating the measure of distinction comprises a proximity search using the stored attribute information as criteria for performing the proximity search.

28. The system of claim 27, wherein the processor is further configured to provide the user with an opportunity to further refine the proximity search.

29. The system of claim 23, wherein the display device displays a plurality of stored images, and wherein the processor is further configured to provide the user with an opportunity to indicate interest in the first image by selecting the first image from the plurality of stored images.

30. The system of claim 29, wherein the display device displays one or more groups of stored images, and wherein the processor is further configured to provide the user with an opportunity to indicate interest in the first image by selecting a group of stored images.

31. The system of claim 29, wherein the one or more groups of stored images are at least partially overlaid on a third image.

32. The system of claim 23, wherein the processor is further configured to provide the user with an opportunity to create an image based on desired attribute information.

33. The system of claim 23, wherein the processor is further configured to provide the user with an opportunity to purchase an item associated with the second image.

34. A non-transitory machine-readable storage medium for use in allowing a user of a browsing application to navigate image-based content using a graphical user interface, comprising machine program logic recorded thereon for causing a processor to perform the steps of:

storing a plurality of images, wherein each image depicts an item;

analyzing a first image of the plurality of images to detect attribute information associated with a first item depicted in the first image, wherein the attribute information comprises a plurality of categories, including a color category;

storing the associated attribute information;

receiving a user selection, from a user, of the first image depicting the first item;

calculating a measure of distinction between the first item and a second item based on the plurality of categories, wherein the measure of distinction represents an alignment of categories between the first and second items;

determining the second item to be similar to the first item if the measure of distinction satisfies a criterion; and displaying a second image of the plurality of images depicting the second item.

35. The non-transitory machine-readable medium of claim 34, wherein the attribute information is derived from a sample of a desired item.

36. The non-transitory machine-readable medium of claim 35, further comprising machine program logic for:

generating an image based on the sample.

37. The non-transitory machine-readable medium of claim 36, further comprising machine program logic for:

storing the generated image.

38. The non-transitory machine-readable medium of claim 34, wherein calculating the measure of distinction comprises a proximity search using the stored attribute information as criteria for performing the proximity search.

39. The non-transitory machine-readable medium of claim 38, further comprising machine program logic for:

providing the user with an opportunity to further refine the proximity search.

40. The non-transitory machine-readable medium of claim 34, further comprising machine program logic for:

displaying a plurality of stored images; and allowing the user to indicate interest in the first image by selecting the first image from the plurality of stored images.

41. The non-transitory machine-readable medium of claim 40, further comprising machine program logic for:

displaying one or more groups of stored images; and allowing the user to indicate interest in the first image by selecting a group of stored images.

42. The non-transitory machine-readable medium of claim 40, wherein the one or more groups of stored images are at least partially overlaid on a second stored third image.

43. The non-transitory machine-readable medium of claim 34, further comprising machine program logic for:

providing the user with an opportunity to create an image based on desired attribute information.

44. The non-transitory machine-readable medium of claim 34, further comprising machine program logic for:

providing the user with an opportunity to purchase an item associated with the second image.

\* \* \* \* \*

UNITED STATES PATENT AND TRADEMARK OFFICE
CERTIFICATE OF CORRECTION

| | | |
|---|---|---|
| PATENT NO. | : 9,152,624 B1 | Page 1 of 1 |
| APPLICATION NO. | : 12/953184 | |
| DATED | : October 6, 2015 | |
| INVENTOR(S) | : Krallman et al. | |

It is certified that error appears in the above-identified patent and that said Letters Patent is hereby corrected as shown below:

In the Claims:

At column 17, claim 18, line 66, delete "selected stored".

At column 18, claim 19, line 5, delete "selected stored".

At column 20, claim 42, line 23, delete "second stored".

Signed and Sealed this
Sixteenth Day of February, 2016

Michelle K. Lee
*Director of the United States Patent and Trademark Office*